(No Model.)
J. KOHLER & L. ARNOLD.
Faucet.
No. 231,178. Patented Aug. 17, 1880.
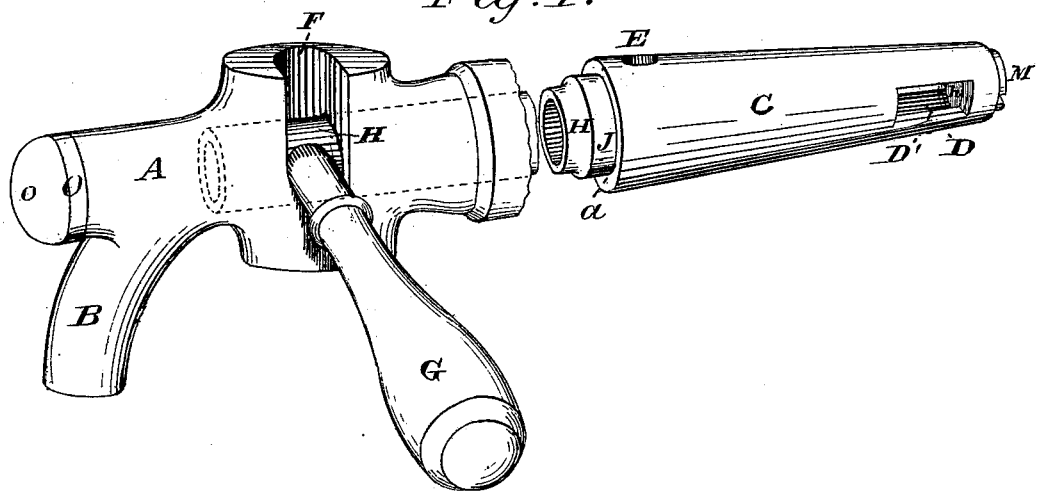
Fig. 1.
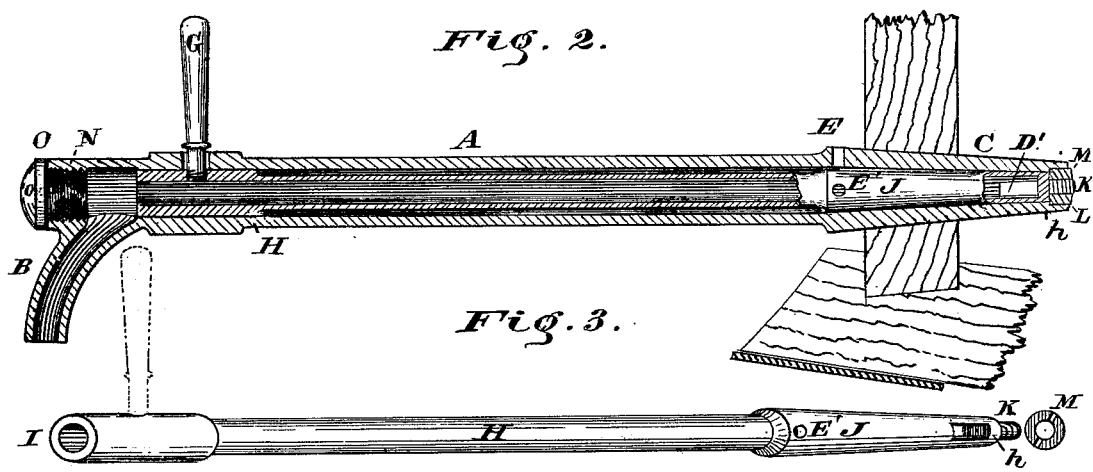
Fig. 2.
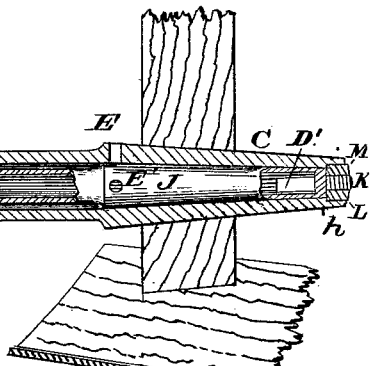
Fig. 3.
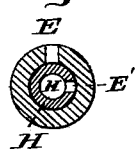 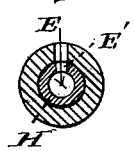  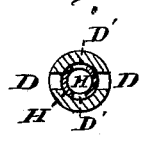
Fig. 4.   Fig. 5.   Fig. 6.   Fig. 7.
Attest.
P. Knight
Herbert Knight
Inventors.
Joseph Kohler
Louis Arnold
by Knight Bros attys

UNITED STATES PATENT OFFICE.

JOSEPH KOHLER AND LOUIS ARNOLD, OF CINCINNATI, OHIO.

FAUCET.

SPECIFICATION forming part of Letters Patent No. 231,178, dated August 17, 1880.

Application filed May 3, 1880. (No model.)

*To all whom it may concern:*

Be it known that we, JOSEPH KOHLER and LOUIS ARNOLD, both of Cincinnati, Hamilton county, Ohio, have jointly invented a new and useful Improvement in Beer-Faucets, of which the following is a specification.

Our invention relates to a faucet for beer-casks, &c., which shall be self-draining after each closure of the spigot. For this purpose our spigot consists of a peculiarly-formed tubular valve or beer-duct, arranged coaxially within the shell or barrel of the faucet. Said duct is adapted for a quarter-rotation to the right and left for opening and closing the faucet, and has at its rear extremity, within the cask, a port which, in the open condition of the faucet, communicates with a corresponding port in the faucet-shell. In addition to this port, the said duct has another port as near the rear extremity as is compatible with communication with the atmosphere through a corresponding orifice in the shell at each and every closure of the faucet, in order to permit the prompt and automatic drainage of the faucet.

The application of our invention to beer-faucets, for which it is more especially designed, prevents the liability of serving the first glass after a period of disuse in a warm and stale condition, tasting of the faucet and poisoned by metallic oxides.

In the accompanying drawings, Figure 1 is a perspective view of a faucet embodying our invention, the faucet being shown open and a portion from the center being broken away. Fig. 2 is an axial section of the faucet, also in its open condition, and a portion of the beer-duct, including the air-inlet, being shown in relief. Fig. 3 is a perspective view of our beer-duct detached. Figs. 4 and 5 are cross-sections in the plane of the air-inlet in the closed and open conditions of said inlet, respectively. Figs. 6 and 7 are cross-sections in the plane of the beer-port in its open and closed conditions, respectively.

The outer shell or barrel, A, may be either a single cast tube, as in Fig. 2, or be composed of two or more cast sections firmly screwed or otherwise fastened together, as in Fig. 1. B may represent a customary spout or nozzle. The shell A terminates rearwardly in the customary cone C, to occupy a hole in the cask.

The cone C has near its rear end a port or orifice, D, communicating with the interior of the cask. Said shell has also near its rear end, but so much in front of port D as to be outside the cask, an orifice, E, through its upper side, which, on the closure of the faucet, serves as an air-inlet. The shell A has, further, a transverse slot, F, near its front end, through which extends the handle G of our beer-duct H.

The beer duct or valve H is a tube having a cylindrical bore, which tube occupies the bore of the shell A. This tube is open at its front end, I, as seen in Figs. 2 and 3, and has the represented conical rear termination, J, which termination is ground to fit a correspondingly conical seat, $a$, of the shell. The said duct H is closed at its rear extremity, $h$, and its conical portion is traversed by ports D′ and E′, corresponding to the ports D and E in the shell. The ports D′ and E′ have such circumferential location on the duct as never to be simultaneously coincident with their corresponding openings D and E in the shell, the ports D and D′ being coincident only in the open condition of the faucet, and the ports E and E′ being coincident only in its closed condition.

Screwed to one side of duct H is the arm or handle G, by means of which said duct is rendered capable of being rotated as far as permitted by the slot F—say one-fourth of a circle.

Projecting from the rear extremity of the duct H is a screw, K, which, passing out through an orifice, L, at rear end of shell, receives a nut, M, that serves to hold the duct in place. The bore of the shell extends with its full diameter to the front end, where it is screw-threaded at N to receive a correspondingly screw-threaded plug, O, which has a convex head, $o$, to adapt it for receiving the blows of the mallet in driving the faucet into the hole in the cask-head.

The turning of the handle G down to the position shown in Fig. 1 brings the ports D and D′ in communication, as seen in Figs. 1, 2, and 6, and permits beer to flow from the cask outward through the faucet. When the volume of beer that has passed through the faucet, added to that remaining within the faucet, equals the amount desired to be drawn, the attendant closes the faucet by turning the handle G to the vertical position, puts the ports D and D' out of communication, and consequently closes the faucet. This position of the handle turns the duct H to the position shown in Figs. 5 and 7, in which the air-inlets E E' are placed in communication, so as to admit air to the rear end of the duct, which, neutralizing the atmospheric pressure at the mouth of the faucet, permits the contents of the faucet to escape.

Should it be desired to swab out the faucet, access can be had for that purpose without removing the faucet from the cask by simply unscrewing the plug O.

Should it be desired to remove the duct H, such removal can be readily accomplished after detaching the handle G, plug O, and nut M.

It will thus be seen that every part of the faucet which is in contact with the liquor is susceptible of ready and thorough cleansing, and, if necessary, of replacement of new for old parts or of repair of any of them.

While described and intended principally for beer, our faucet may be usefully employed for other liquids—for example, the delivery of water in situations where any residue would be liable to freeze within the faucet.

If preferred, the vertical condition of the handle G may open instead of close the faucet. This position is shown in Figs. 2 and 3.

We claim as new and of our invention—

In combination with a faucet shell or barrel having air-port E outside of and beer-port D inside of the cask, the contained beer-duct H, whose ports E' and D' communicate alternately with the corresponding ports in the shell, substantially as set forth.

In testimony of which invention we hereunto set our hands.

JOSEPH KOHLER.
LOUIS ARNOLD.

Attest:
GEO. H. KNIGHT,
W. TYSON JUDKINS.